United States Patent
Menezo

(10) Patent No.: US 11,531,171 B2
(45) Date of Patent: Dec. 20, 2022

(54) PHOTONIC CHIP WITH INTEGRATED COLLIMATION STRUCTURE

(71) Applicant: COMMISSARIAT À L'ÉNERGIE ATOMIQUE ET AUX ÉNERGIES ALTERNATIVES, Paris (FR)

(72) Inventor: Sylvie Menezo, Voiron (FR)

(73) Assignee: COMMISSARIAT Á L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 183 days.

(21) Appl. No.: 16/614,221

(22) PCT Filed: May 16, 2018

(86) PCT No.: PCT/FR2018/051177
§ 371 (c)(1),
(2) Date: Nov. 15, 2019

(87) PCT Pub. No.: WO2018/211214
PCT Pub. Date: Nov. 22, 2018

(65) Prior Publication Data
US 2021/0333491 A1 Oct. 28, 2021

(30) Foreign Application Priority Data
May 17, 2017 (FR) .................................... 1754361

(51) Int. Cl.
*G02B 6/42* (2006.01)
(52) U.S. Cl.
CPC .................. *G02B 6/4214* (2013.01)
(58) Field of Classification Search
CPC .................................................. G02B 6/4214
(Continued)

(56) References Cited

U.S. PATENT DOCUMENTS

| 2002/0126942 A1* | 9/2002 | Evans ..................... H01S 5/187 385/14 |
| 2004/0008916 A1* | 1/2004 | Ridgway ............... G02F 1/0136 385/2 |

(Continued)

FOREIGN PATENT DOCUMENTS

| EP | 3002568 A1 | 4/2016 |
| EP | 3159721 A1 | 4/2017 |

(Continued)

OTHER PUBLICATIONS

Search Report for French Application No. 1754361 dated Jan. 23, 2018.

(Continued)

*Primary Examiner* — Kaveh C Kianni
(74) *Attorney, Agent, or Firm* — Pearne & Gordon LLP

(57) ABSTRACT

Optical beam forming at the inputs/outputs of a photonic chip and to the spectral broadening of the light coupled to the chip. The photonic chip comprises an optical waveguide layer supported on a substrate. The chip includes an optical waveguide structure made of silicon and a coupling surface grating. The photonic chip has a front face on the side facing the coupling surface grating and a rear face on the side facing the substrate. A reflecting collimation structure is integrated in the rear face to modify the mode size of an incident light beam. The coupling surface grating is designed to receive light from the optical waveguide structure and to form a light beam directed to the reflecting collimation structure. The invention further relates to the method for producing such a chip.

13 Claims, 17 Drawing Sheets

(58) Field of Classification Search
USPC .......................................................... 385/14
See application file for complete search history.

(56) References Cited

U.S. PATENT DOCUMENTS

| | | | |
|---|---|---|---|
| 2005/0135732 A1 | 6/2005 | Crow et al. | |
| 2010/0322631 A1* | 12/2010 | Nagarajan | G02B 6/12009 |
| | | | 398/65 |
| 2013/0209026 A1* | 8/2013 | Doany | G02B 6/34 |
| | | | 385/14 |
| 2015/0037044 A1* | 2/2015 | Peterson | G02B 6/43 |
| | | | 398/135 |
| 2016/0091368 A1 | 3/2016 | Fish et al. | |
| 2016/0109699 A1 | 4/2016 | Margallo Balbas et al. | |
| 2016/0164613 A1 | 6/2016 | Menezo et al. | |
| 2016/0266322 A1* | 9/2016 | Epitaux | G02B 6/138 |
| 2016/0299292 A1 | 10/2016 | Hassan et al. | |
| 2017/0115458 A1 | 4/2017 | Mekis et al. | |
| 2017/0207600 A1* | 7/2017 | Klamkin | H01S 5/142 |
| 2018/0212399 A1 | 7/2018 | Menezo et al. | |
| 2018/0231732 A1* | 8/2018 | Paquet | H01S 5/18361 |
| 2019/0094467 A1 | 3/2019 | Hassan et al. | |
| 2019/0170937 A1 | 6/2019 | Menezo et al. | |
| 2019/0243064 A1 | 8/2019 | Menezo et al. | |
| 2019/0280461 A1 | 9/2019 | Menezo et al. | |

FOREIGN PATENT DOCUMENTS

| | | |
|---|---|---|
| JP | H04-275483 A | 10/1992 |
| JP | H09-191155 A | 7/1997 |
| JP | 2005182033 A | 7/2005 |

OTHER PUBLICATIONS

International Search Report for PCT/FR2018/051177 dated Oct. 1, 2018.
Written Opinion for PCT/FR2018/051177 dated Oct. 1, 2018.
Chen, Xia et al. "Apodized Waveguide Grating Couplers for Efficient Coupling to Optical Fibers" In: IEEE Photonics Technology Letters, Aug. 1, 2010, vol. 22, No. 15, pp. 1156-1158.
Bernabé, Stéphane et al. "On-Board Silicon Photonics-Based Transceivers With 1-Tb/s Capacity" In: IEEE Transaction on Components, Packaging and Manufacturing Technology, Jul. 2016, vol. 6, No. 7, pp. 1018-1025.
Sacher, Wesley et al. "Wide bandwidth and high coupling efficiency Si3N4-on-SOI dual-level grating coupler" In: Optics Express, 2014, pp. 10938-10947.
Streibl N. et al., "Parallel optoelectronic interconnections with high packing density through a light-guiding plate using grating couplers and field lenses" In: Optics Communications, Jun. 1, 1993, vol. 99, No. 3-4, pp. 167-171.
Office action for Japanese patent application No. 2019-563362 dated Feb. 28, 2022.

* cited by examiner

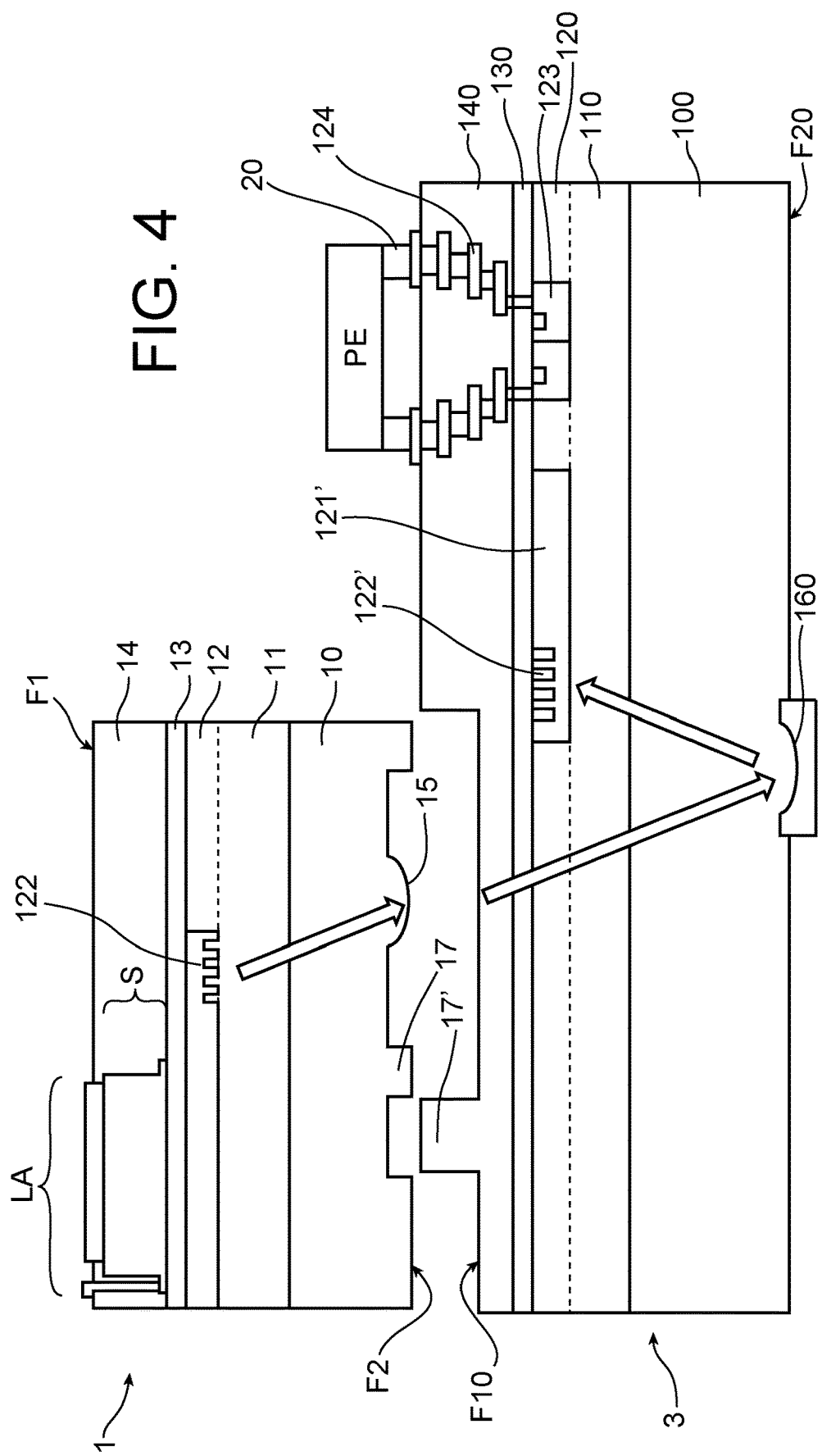

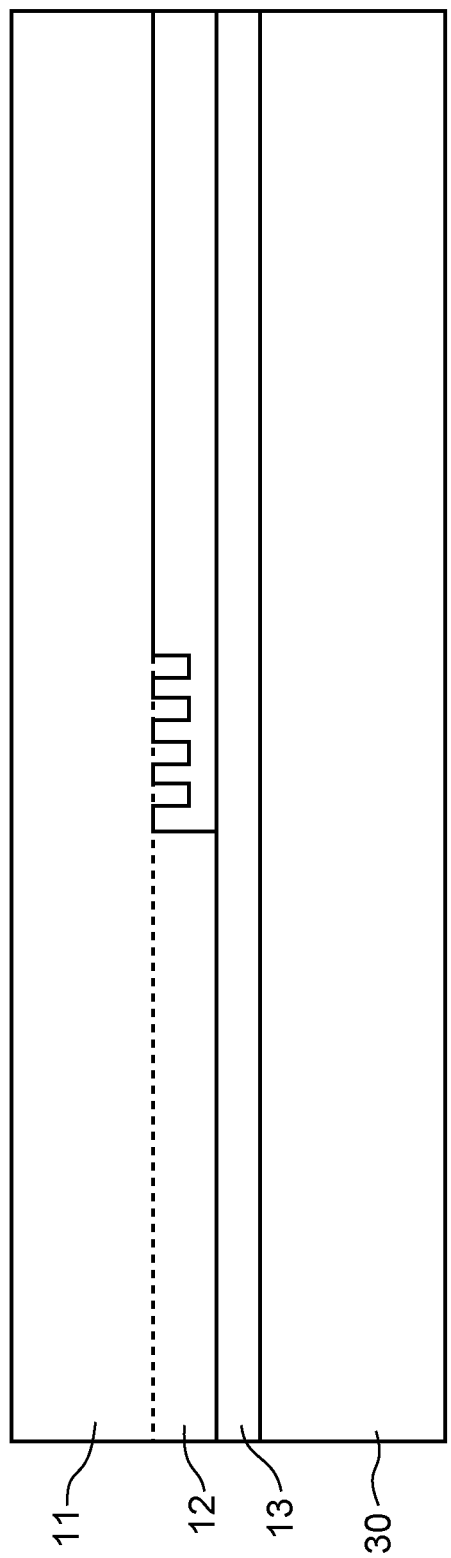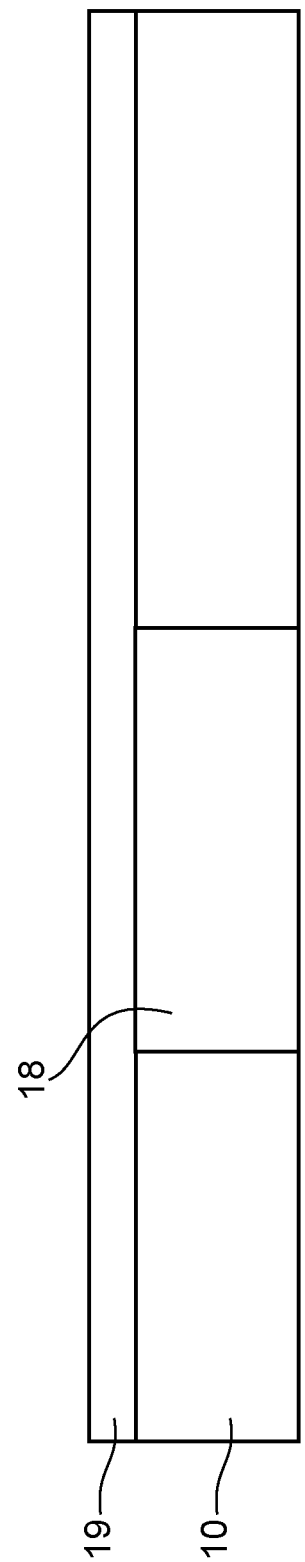

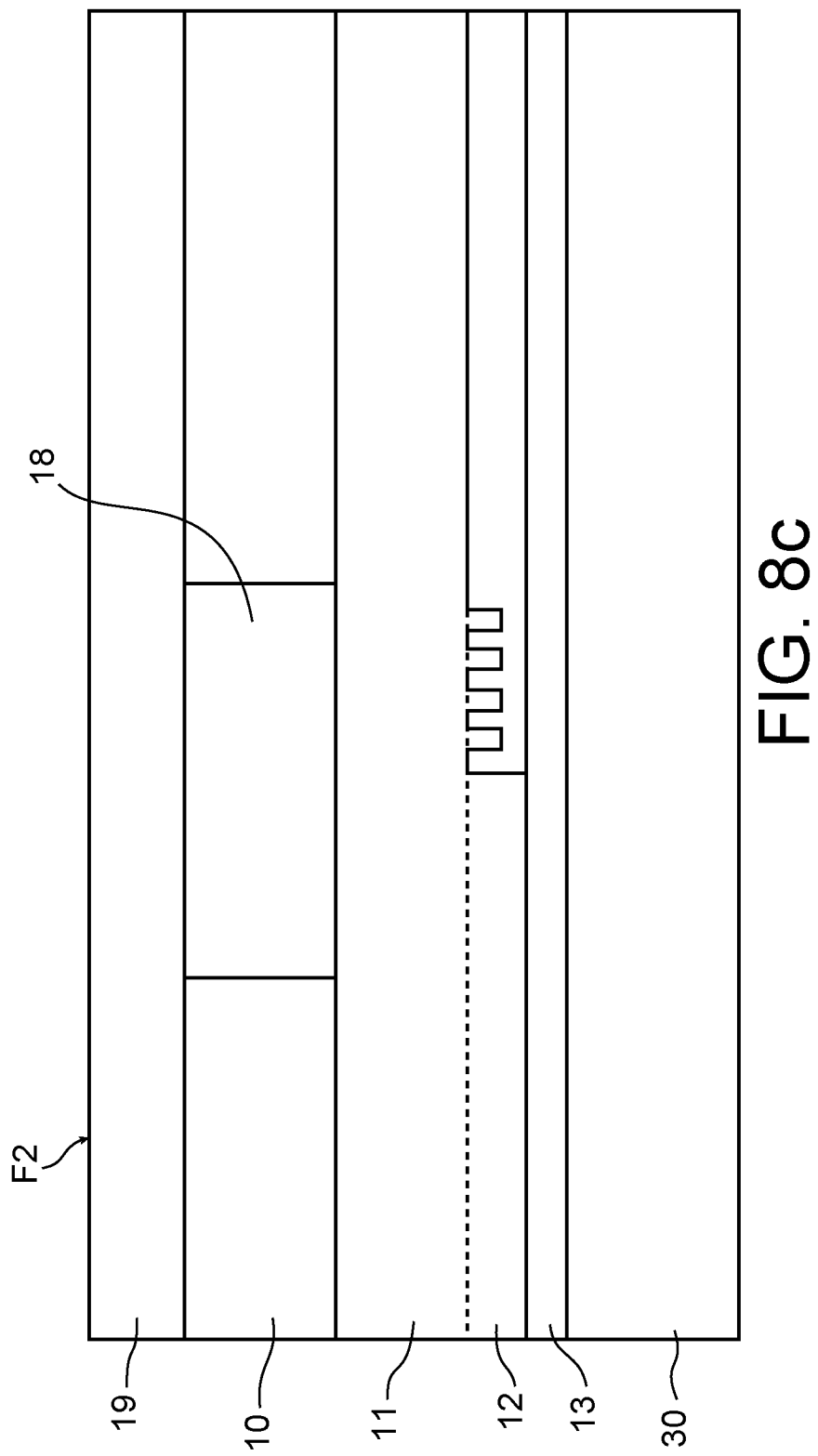

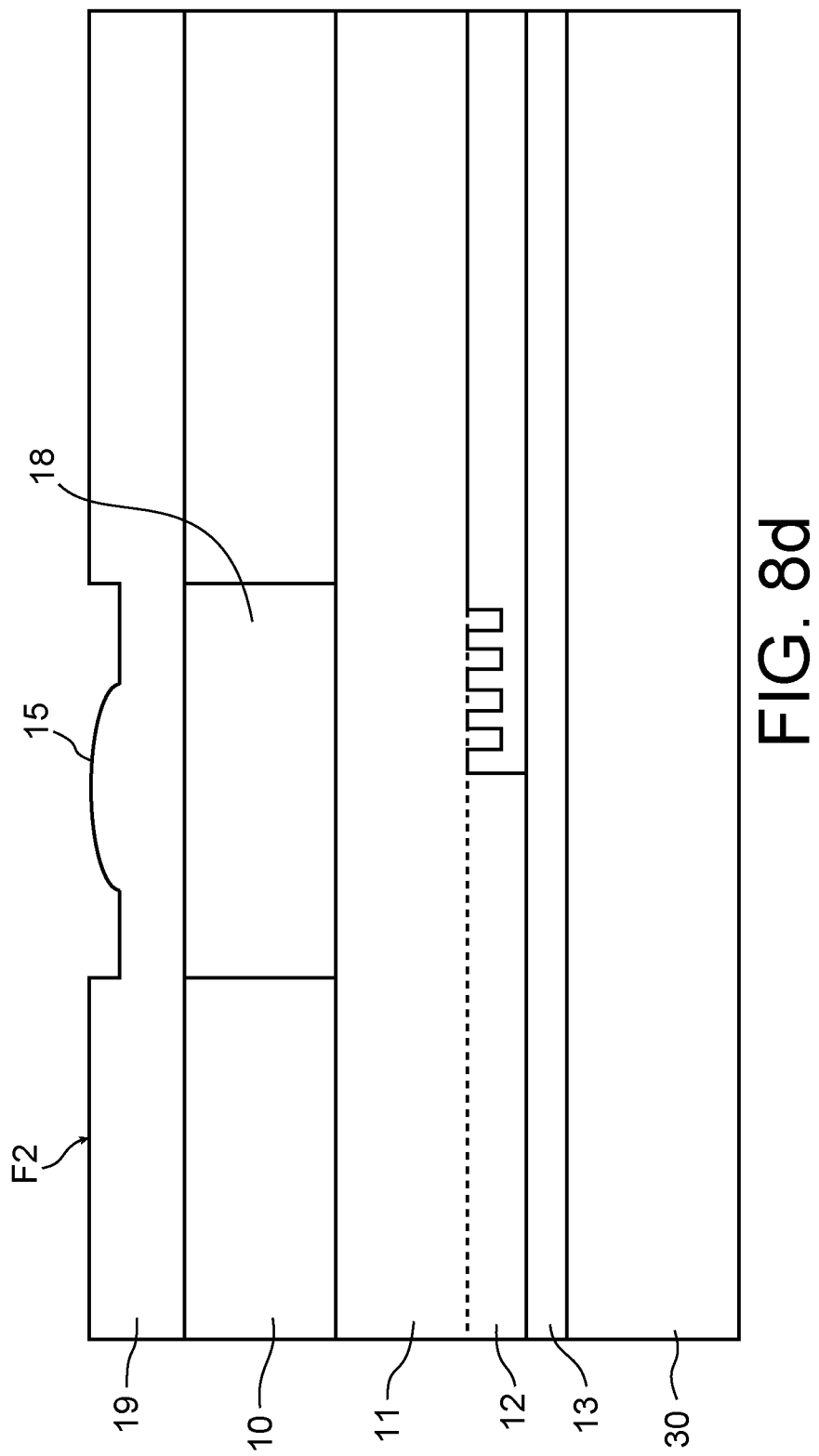

PHOTONIC CHIP WITH INTEGRATED COLLIMATION STRUCTURE

CROSS-REFERENCE TO RELATED APPLICATIONS

This is a National Stage application of PCT international application PCT/FR2018/051177, filed on May 16, 2018, which claims the priority of French Patent Application No. 17 54361, filed May 17, 2017, both of which are incorporated herein by reference in their entirety.

FIELD OF THE INVENTION

The field of the invention is that of on-chip-integrated photonics. The invention relates to a photonic chip having input(s)/output(s), to/from the chip, of light beams with an expanded mode size, and potentially an expanded spectral band, for coupling with an external device, for example with another photonic chip, an optical fibre or a set of optical fibres, or for receiving/emitting a freely propagating light beam.

The photonic chip according to the invention may integrate one or a plurality of hybrid lasers, such as lasers having a gain medium made of III-V semiconductor materials on a silicon substrate. Such a chip is either intended to supply a comb of wavelengths emitted by a plurality of hybrid lasers to another photonic chip, or intended to emit a freely propagating light beam.

STATE OF THE RELATED ART

Photonic chips comprising a photonic integrated circuit are generally produced on SOI ("Silicon On Insulator") substrates for silicon photonic technology.

In this context, a III-V/Silicon hybrid light source is formed by the stacking on an SOI substrate of III-V layers forming the gain material of a laser. The light emitted by the laser is coupled with a light guiding structure in the superficial silicon layer of the SOI substrate, underlying the III-V layers.

The light guiding structure accommodates the silicon photonic components, such as passive components (for example waveguides, optical multiplexers/demultiplexers, resonant rings) and active components (for example modulators formed by P and N doping of the superficial silicon layer).

In order to be able to extract the light from the photonic chip towards an external device such as an optical fibre, the component most commonly used in silicon photonics is the surface coupling array. Such an array makes it possible, on one hand, to adapt the size of the optical mode propagated in waveguides of the photonic chip to the size of the optional mode propagating in standard single-mode fibres, i.e. a diameter of 9.2 µm, and, on the other, to switch from a propagation guided in the plane of the photonic chip to a free-space propagation quasi-vertical to the plane of the chip and on the side opposite the chip substrate. This is obtained by etching an array on the side opposite the substrate. Such a component is for example described in: "Apodized Waveguide Grating Couplers for Efficient Coupling to Optical Fibers", IEEE PHOTONICS TECHNOLOGY LETTERS, VOL. 22, NO. 15, Aug. 1, 2010, by Xia Chen et al.

In silicon technology, this component thus makes it possible to couple the light from a waveguide in the plane of the photonic chip to a cleaved single-mode fibre forming an angle with the vertical, routinely about 8°. Such a component has been proposed for receiving/transferring the light guided from/to the waveguide and forming/receiving a light beam of mode size equal to 9.2 µm, similar to the mode size of a single-mode fibre, which corresponds to optimised light coupling between the silicon waveguide of the photonic chip and the cleaved single-mode fibre. The losses thereof are from 1 to 4 optical dB when the geometric alignment between the surface coupling array and the single-mode fibre is optimal. The array-fibre alignment tolerance, characterised as the radial misalignment with respect to the optimal alignment which induces a further 1 dB of losses, is about 2 µm.

It is also to be noted that the spectral bandwidth of a surface coupling array (characterised as the band for which the losses are limited, for example less than 1 dB) is narrow, and generally less than 30 nm. This is a very limiting point for example in coarse wavelength multiplexing applications (CWDM for "Coarse Wavelength Division Multiplexing") for which a plurality of wavelengths (for example four wavelengths) at 20 nm intervals must be multiplexed and transmitted in a single fibre. The light signal has in this example a spectral band of 4×20 nm and the losses at the ends of the band are then increased by several dB with respect to the losses at the centre of the band. In an example of an embodiment, the transmission losses of a surface coupling array are 2.7 dB at the central wavelength 1290 nm, whereas they are 5.5 dB at the wavelength 1330 nm spaced by 2*20 nm from the central wavelength 1290 nm.

To solve this problem, relatively complex surface coupling arrays have been proposed which require an additional structured silicon nitride layer on top of the structured silicon layer. Reference may be made to the article by Sacher, Wesley D., et al. entitled "Wide bandwidth and high coupling efficiency Si3N4-on-SOI dual-level grating coupler", Optics express 22.9 (2014): 10938-10947. Moreover, this type of solution only functions for polarised light (for example TE), but no solution has been proposed for coupling any polarisation light in the photonic chip.

Only so-called butt coupling solutions make it possible to increase the spectral band of the optical coupling while functioning for any polarisation light. However, these solutions have two major drawbacks:

they do not allow testing of the components at the substrate level: indeed, it is necessary to cut the chips off the substrate (separate them) and then test them by means of the "butt" thereof;

once coupled in the chip, any polarisation light must be broken down according to the 2 TE and TM chip polarisations. The TM polarisation must be rotated and converted into TE polarisation. This requires adding light polarisation management circuits on the photonic chip, these circuits adding wavelength-dependent losses.

There is represented in FIG. 1 a schematic cross-sectional view of a photonic chip integrating a III-V semiconductor hybrid laser structure on silicon-on-insulator substrate. The photonic chip comprises a light guiding layer 12 supported by a silicon substrate 10 and coated with a first layer 13, generally made of SiO2, serving as a bonding interface between the III-V semiconductor stack and the silicon guiding layer. This layer 13 is optional and the bonding with the III-V stack may also be performed directly. The light guiding layer 12 bears the photonic components (waveguide, surface coupling array, PN modulator, etc.), the manufacture whereof is carried out in a silicon-on-insulator layer for example by etching. In such a scenario, the light guiding layer 12 is separated from the silicon substrate 10 by a buried oxide layer 11 (BOX).

The photonic chip integrates a III-V semiconductor Silicon hybrid laser LA. The laser LA includes a gain structure on the first layer 13. The gain structure comprises a stack S of layers of III-V materials wherein the N and P layers are in contact with the electrodes E. The laser LA is encapsulated in a second so-called encapsulation layer 14, for example made of silicon oxide or silicon nitride. The encapsulation layer 14 comprises the electrodes E of the laser as well as the electrical interconnection metal levels with the active components of the layer 12 (such as the modulator) of the electronic chip. This layer is known as the "Back End Of Line" (BEOL) in the manufacturing processes used in microelectronics.

The photonic chip thus has a front face F1 on the side of the encapsulation layer 14 and a rear face F2 on the side of the substrate 10.

The light guiding layer 12 includes a light guiding structure 121 optically coupled with the laser to receive, filter and guide the light emitted thereby. The light guiding layer 12 also includes a surface coupling array 122 configured to receive light from the light guiding structure 121 and form therefrom a light beam directed towards the front face F1 of the photonic chip. The light guiding structure particularly comprises a waveguide, herein represented with the surface coupling array 122 along a longitudinal cross-section, the light propagating in these components in the plane of the figure, for example in the Y direction when herein in FIG. 1 extracting light from the photonic chip with the surface coupling array 122 is involved.

The light guiding structure thus comprises the various passive or active photonic components, up to the input/output port formed by the surface coupling array 122.

The encapsulation layer 14 generally comprises electrical interconnection metal levels of the photonic chip. This layer is thus formed of dielectric materials and etched metal lines. An electronic chip intended to control or read the active photonic components of the photonic chip (modulators, photo-detectors) is generally mounted on the front face of the photonic chip.

In order to increase the mode size of the optical beam at the chip output, for example to increase the alignment tolerance between the surface coupling array 122 and the optical fibre and thus render the alignment operations less complex and particularly feasible according to less costly passive alignment techniques, it was proposed in the article by S. Bernabé et al., "On-Board Silicon Photonics-Based Transceivers With 1-Tb/s Capacity", in IEEE Transactions on Components, Packaging and Manufacturing Technology, vol. 6, No. 7, July 2016, to use a two-lens system composed of a first lens secured to the photonic chip and a second lens secured to the optical fibre. This system may use a lens connector wherein the optical fibre is inserted positioning same for this purpose facing the second lens. The first lens must for its part be aligned with the photonic chip very precisely, then must be rigidly connected therewith. The alignment tolerance between the chip+first lens assembly and second lens+fibre assembly is then increased to +/−20 µm.

In order to extend and collimate a light source of wavelength $\lambda$ and of mode size $Do=2*wo=9.2$ µm at the output of the surface coupling array, the first lens must have a focal length in air equal to $Fair=Di. (\pi. wo/2\lambda)$, Di being the size of the expanded beam at the output of the first lens. To obtain an expanded collimated beam with a diameter Di of about 100 µm, and assuming by simplification an output angle of the surface coupling array with respect to the vertical of 0°, the convex lens, made of silica glass of index 1.45 at the wavelength 1.31 µm, must have a thickness of about 860 µm, corresponding to a focal length in air of about 600 µm.

It cannot be envisaged to use such a glass thickness between the surface coupling array 122 and the front face F1 of the photonic chip. Indeed, the encapsulation layer 14 has generally a thickness of merely about 3 µm. The lens therefore cannot be integrated at the level of this encapsulation layer 14 but must be mounted on the front face of the photonic chip very precisely (the alignment tolerance being of the order of 2 µm) before being secured therewith.

This lens may for example be secured to the photonic chip by means of copper micropillars, the gap between the lens and the photonic chip being filled with a filling layer made of a polymer material. With such a securing process, the filling layer is located on the optical path of the light beam between the surface coupling array and the lens. Introducing this layer of polymer material generates additional losses.

Finally, the spectral band of a light beam at the input or output of such a photonic chip/lens system is about 30 nm, which does not permit the implementation of for example this solution with a multiplexing over an 80 nm band of 4 CWDM type wavelengths.

DESCRIPTION OF THE INVENTION

The aim of the invention is that of making it possible to do without the complex and costly alignment operation of the lens with the photonic chip.

It proposes for this purpose a photonic chip comprising a light guiding layer supported by a substrate, the light guiding layer including a light guiding structure optically coupled with a surface coupling array. The photonic chip has a front face on the side of the surface coupling array and a rear face on the side of the substrate. It further includes a collimation structure integrated at the level of the rear face to increase the mode size of an incident light beam on said structure from the surface coupling array, the surface coupling array being configured to receive light from the light guiding structure and form a light directed towards the collimation structure integrated at the level of the rear face. The collimation structure is a reflective structure suitable for reflecting an incident beam from the surface coupling array towards the front face.

Certain preferred but non-limiting aspects of this chip are as follows:
- the substrate is made of a first dielectric material;
- the rear face is coated with a layer of a second dielectric material of higher effective index than the effective index of the first dielectric material, and the reflective collimation structure is formed in the layer of the second dielectric material;
- the substrate is made of silicon;
- the light guiding layer rests on a layer of dielectric material, and an anti-reflection layer is inserted between the substrate and the layer of dielectric material;
- the substrate comprises an air or oxide cavity formed on the light path between the surface coupling array and the reflective collimation structure;
- the surface coupling array has etching teeth oriented towards the rear face;
- the surface coupling array is configured to receive/transfer light from/to the light guiding structure and form/receive a light beam of mode size less than 6 µm towards/from the reflective collimation structure;

the rear face has alignment patterns with an external device;

the light guiding structure comprises an active photonic component and electrical interconnections connected to the photonic component are formed in the substrate and open onto the rear face;

it further comprises a hybrid silicon integrated laser comprising a gain structure on top of the light guiding layer and optically coupled with the light guiding structure.

The invention also relates to a photonic chip comprising an active photonic chip, electrical interconnections to the active photonic component and an electronic chip mounted on the rear face of the photonic chip and connected to electrical interconnections. It also relates to a photonic chip with integrated hybrid laser optically coupled with a further photonic chip according to the invention.

BRIEF DESCRIPTION OF THE DRAWINGS

Further aspects, aims, advantages and features of the invention will emerge more clearly on reading the following detailed description of preferred embodiments thereof, given by way of non-limiting example, with reference to the appended drawings wherein:

FIG. 4 illustrates the coupling of a photonic chip according to FIG. 2 with another photonic chip;

FIGS. 7a-7i illustrate an example of an embodiment of the photonic chip in FIG. 5a;

FIGS. 8a-8e illustrate an example of an embodiment of the photonic chip in FIG. 6.

DETAILED DESCRIPTION OF PARTICULAR EMBODIMENTS

The invention relates to a photonic chip of increased mode size (at the output or input of the photonic chip).

Figure 1:
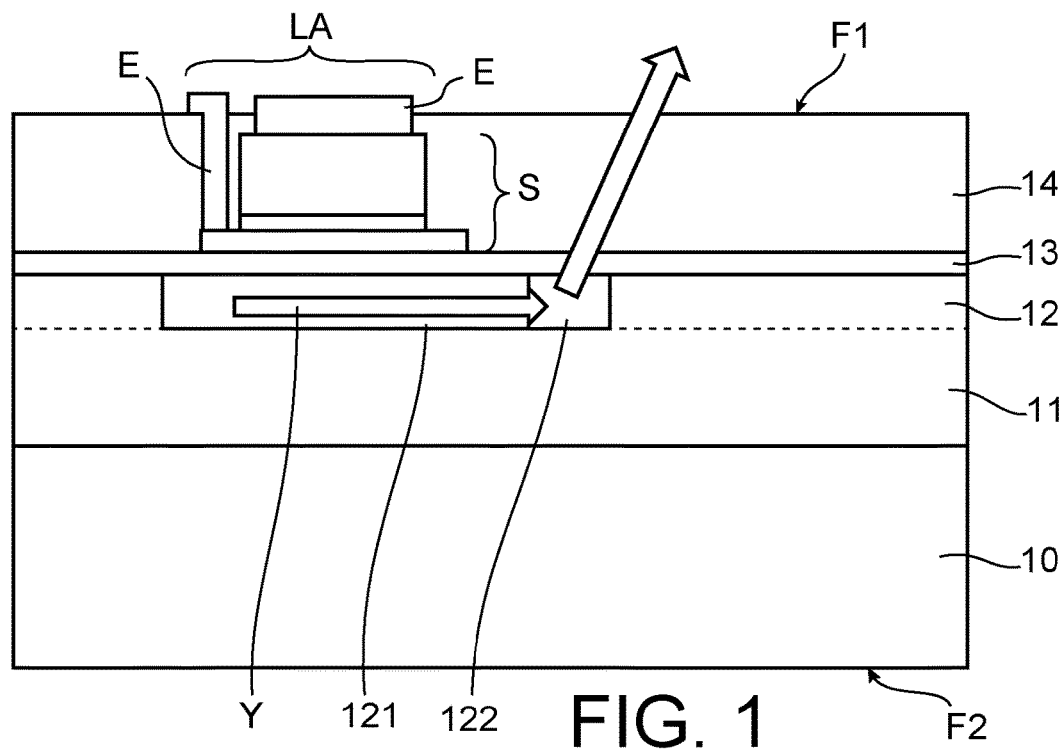
FIG. 1, already discussed above, is a schematic cross-section of a photonic chip integrating a hybrid III-V semiconductor on silicon laser structure.
Figure 2:
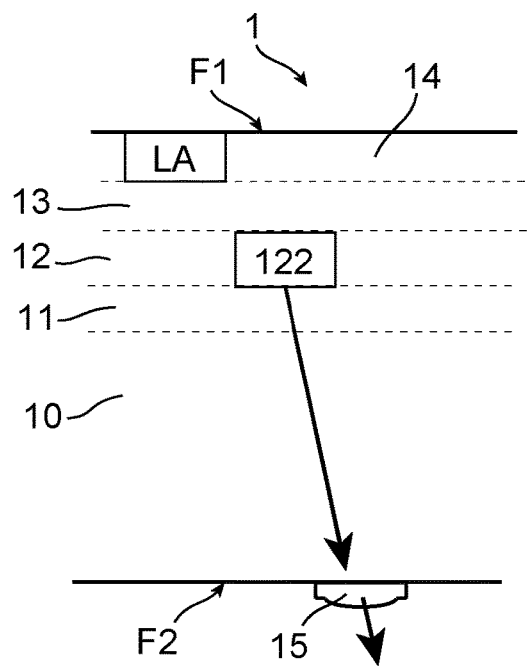
FIGS. 2 and 3 are schematic cross-sections of photonic chips according to the invention having an integrated collimation structure on the rear face and a surface coupling array directing the light towards the collimation structure on the rear face.
Figure 3:
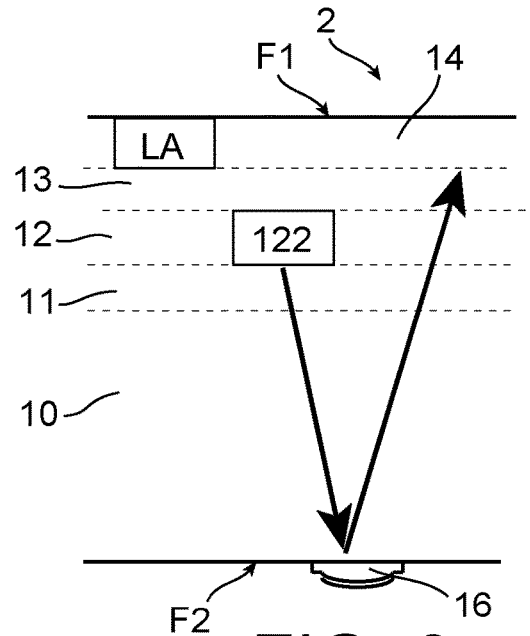

With reference to FIGS. 2 and 3, the photonic chip 1, 2 comprises a light guiding layer 12 supported by a substrate 10 and coated with an optional layer of silicon oxide 13 (acting as a bonding interface between the substrate and the laser III-V stack). The light guiding layer may comprise a crystalline silicon sublayer (the silicon from the SOI substrate), as well as an amorphous silicon sublayer and/or a silicon nitride sublayer. A layer of dielectric material 11, for example made of $SiO_2$, may be inserted between the light guiding layer 12 and the substrate 10. This layer 11 may also comprise metallic interconnection levels with the active optical components of the layer 12 (see FIGS. 5a and 5b).

The substrate 10 may be a silicon substrate. In one possible embodiment, the substrate 10 is a dielectric substrate, for example a glass substrate, having the advantage of limiting the optical losses at the interface between the dielectric layer 11 and the substrate 10 and if applicable between the substrate 10 and the air. In a further possible embodiment, the substrate 10 is a silicon substrate comprising air or oxide cavities, this embodiment having the advantage of increasing the expanded mode size at the input/output of the photonic chip.

The photonic chip 1, 2 may integrate a hybrid III-V semiconductor on silicon layer LA which comprises a gain structure made of III-V materials on the interface layer 13, or directly in contact with the light guiding layer 12. The gain structure comprises for example a stack S of layers of III-V materials and two electrodes E for making electrical contacts on the gain structure. The laser LA may be encapsulated in a second encapsulation layer 14, for example made of silicon oxide, silicon nitride or of a silicon oxide and silicon nitride mixture, or of a BCB type polymer. The photonic chip thus has a front face F1 on the side of the second encapsulation layer 14 and a rear face F2 on the side of the substrate 10.

The light guiding layer comprises a silicon light guiding structure optically coupled, on one hand, with the laser LA to receive, filter and guide the light emitted by the laser and, on the other, with a surface coupling array 122. Further components may obviously be comprised between the laser and the surface coupling array, on the light path: for example a modulator, and a wavelength multiplexer. And further components may obviously be present on both sides of the laser.

Within the scope of the invention, the surface coupling array 122 is configured to receive light from the light guiding structure and form therefrom a light beam directed towards the rear face F2 of the photonic chip. This configuration of the array 122 thus enables light to pass through the entire thickness of the substrate 10.

The photonic chip 1, 2 further comprises a collimation structure 15, 16 integrated at the level of the rear face F2 and configured to collimate an incident light beam on said structure 15, 16 from the surface coupling array 122 and increase the mode size thereof. The network 122 is indeed configured to direct the light beam towards the collimation structure 15, 16 integrated at the level of the rear face F2.

The photonic chip with integrated collimation structure on the rear face is intended to be optically coupled with a further external device arranged facing the chip, for example a photonic chip, a device comprising one or a plurality of optical fibres, this device comprising at least one optical input and/or output of equivalent mode size to the output of the collimation structure 15, 16 integrated in the chip 1, 2. In the case of a coupling with single-mode fibres, this would consist for example for the external device of so-called "expanded beam" connectors making it possible to switch from a mode size of 9.2 µm (that of single-mode fibres) to a mode size expanded to 50-100 µm.

The photonic chip with integrated collimation structure on the rear face may also be used to emit in a medium when it integrates a laser, for example for LIDAR (Light Detection and Ranging) applications, or receive a non-guided light in a medium.

In a first embodiment represented in FIG. 2, the collimation structure is a lens 15 formed on the rear face of the photonic chip 1, the lens modifying the mode size of the light passing therethrough. The lens 15 takes the form of a spherical dioptre wherein the cap is formed on the rear face, typically by etching. The lens 15 may also be a Fresnel lens. It may be coated with an anti-reflection layer, such as a layer of silicon nitride of thickness $\lambda/4$ where $\lambda$ is the wavelength of the light beam, particularly when the lens is made of silicon.

In a second embodiment represented in FIG. 3, the collimation structure 16 is a reflective structure structured so as to modify the mode size of the light reflected therein. It typically consists of a concave spherical mirror reflecting the incident light from the surface coupling array 122 towards the front face F1 while collimating the reflected light. Such a reflective structure may be produced by forming a lens as in the first embodiment and by coating same with a metal layer, for example a layer of gold, silver or aluminium. The reflective collimation structure on the rear face makes it possible to extract a collimated light beam from the front face of the chip.

By integrating the collimation structure in the photonic chip, the invention makes it possible to do away with the costly steps of fine alignment and securing of the lens on the chip. By collimation structure integrated in the photonic chip it is particularly understood that said structure is manufactured at the wafer level, and more particularly, that the manufacture of said structure can be integrated into a manufacturing process of the photonic chip. It is thus possible to collectively manufacture a plurality of collimation structures on the photonic chip. A single alignment operation between the plurality of collimation structures 15, 16 and the plurality of surface coupling arrays 122 is then necessary (lithographic alignment at wafer level). It is hence possible to manufacture a plurality of chips and the collimation structures thereof at the same time on the same wafer, such that for a plurality of chips, instead of carrying out a plurality of alignments, a single alignment is required.

Moreover, by integrating the collimation structure at the level of the rear face F2 of the photonic chip, the invention makes it possible to ensure that the optical path between the surface coupling array 122 and the outside has a passage via the substrate 10. The optical path between the surface coupling array 122 and the collimation structure 15, 16 may be approximated as the thickness of the substrate 10 with less than 0.5% error. With a silicon substrate 10 of thickness 750 μm, the output beam diameter of the photonic chip may be expanded to about 40 μm.

In the embodiment in FIG. 3, the reflective lens 16 makes it possible to return the collimated beam to the front face F1. This configuration is particularly interesting in the scenario wherein it is sought to mount an electronic chip on the rear face F2 of the photonic chip. In this case, the rear face F2 of the photonic chip is not accessible, and the reflective lens 16 then makes it possible to retrieve the collimated beam on the side of the front face F1. This configuration also proves to be advantageous in that the tests of the active photonic components present in the light guiding layer are facilitated due to the extraction of the collimated beam on the front face.

Fresnel losses are observed upon traversing the interface between the layer 11 and the substrate 10: they are 0.8 dB with an SiO$_2$ layer 11 and a silicon substrate 10. In order to limit these losses, in a possible alternative embodiment of the invention, an anti-reflection layer (for example a silicon nitride layer, of thickness λ/4 where λ corresponds to the light beam wavelength) is arranged between the layer 11 and the substrate 10. It is also possible to adopt by way of material of the layer 11 not SiO$_2$ but a silicon nitride or a stack of a sublayer of SiO2 and a sublayer of silicon nitride. The losses upon traversing the interface between the layer 11 and the substrate 10 are thus less than 0.5 dB at the wavelength 1.31 μm. Moreover, in order to reduce the losses upon traversing the interface between the substrate 10 and the air, it is preferable, particularly when the substrate 10 is made of silicon, to adopt the second embodiment with a reflective collimation structure 16.

In a further alternative embodiment, there is chosen as a substrate 10 a dielectric substrate, for example a glass substrate, typically made of borosilicate glass. Such a dielectric substrate makes it possible to suppress the optical losses at the layer 11-substrate 10 interface and reduce same, if applicable, at the substrate 10-air interface. This alternative embodiment may be used in either of the first and second embodiments. It should be noted that with a glass substrate of thickness 560 μm, the output beam diameter of the photonic chip may be expanded to about 70 μm. The sagittal depth P (see FIG. 6) of the collimation structure is then about 4.6 μm for the 2 embodiments.

Figure 6:
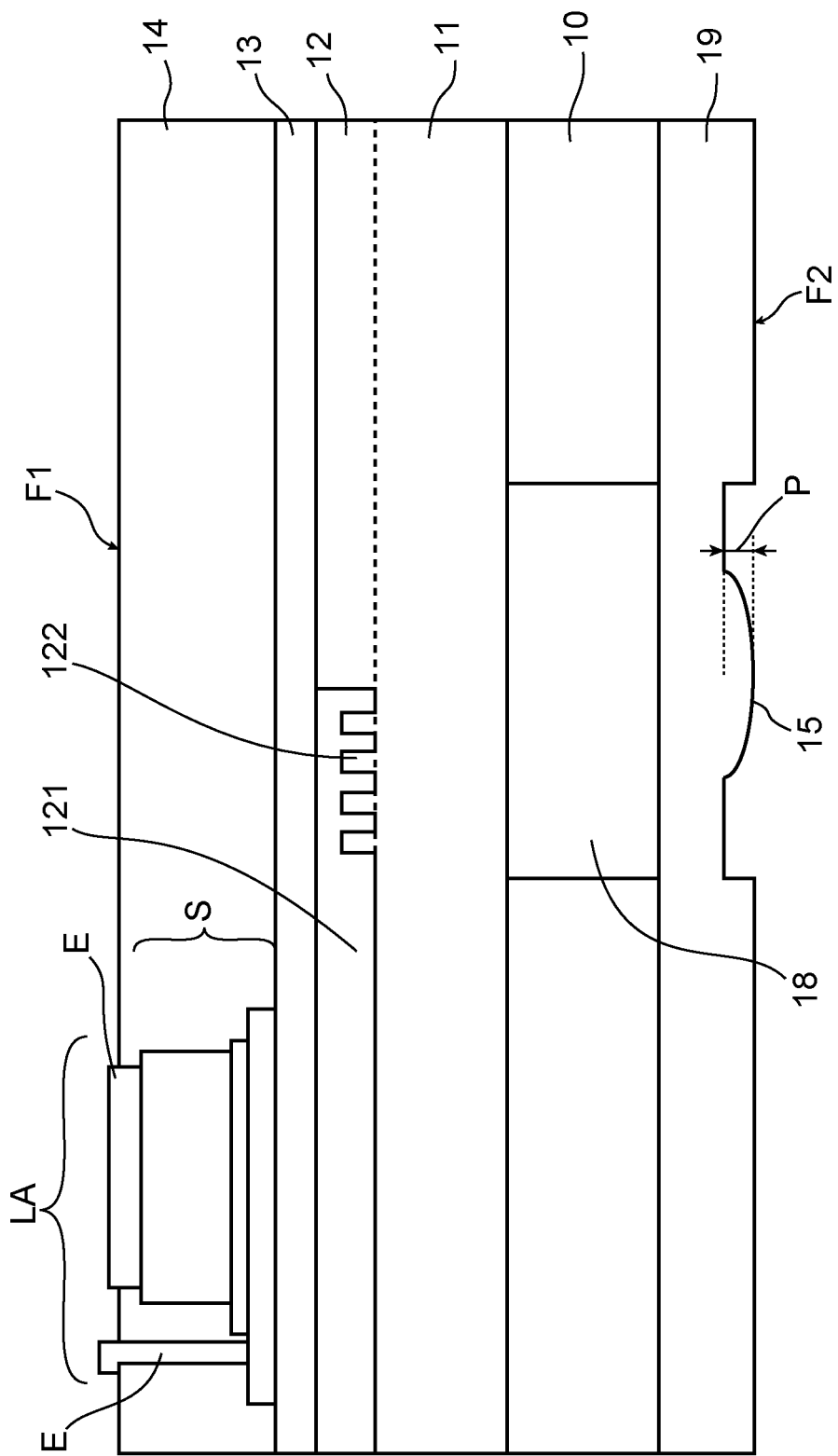
FIG. 6 illustrates an alternative embodiment of a photonic chip according to FIG. 2

In a further alternative embodiment represented in FIG. 6, there is chosen as a substrate 10 a substrate, for example made of silicon, wherein is formed, on the light path between the surface coupling array 122 and the collimation structure 15, 16, an air or oxide cavity 18 (respectively by etching or by localised thermal oxidation on a surface of diameter D of the substrate 10). The collimation structure 15, 16 is then formed in a layer 19 covering the substrate 10 on the side opposite the front face F1. Such a substrate made of silicon makes it possible to preserve the thermal conductivity of silicon (for example at the point where the laser is located) and only use silicon oxide of index 1.45 at the point where light is propagated towards the collimation structure.

So as to reduce the sagittal depth P of the collimation structure 15, 16, the latter may be embodied in a layer formed on the rear face of the photonic chip 1, 2 and having a higher effective index than that of the substrate. It is thus possible to use a silicon nitride layer of index 2 at the wavelength 1.31 μm, making it possible to limit the sagittal depth P to about 2 μm.

There is represented in FIG. 4 the coupling of a photonic chip 1 according to FIG. 2 with another photonic chip 3 according to FIG. 3. The other photonic chip 3 is formed on an SOI substrate and comprises a light guiding layer 120 coated with an encapsulation layer 140 (comprising herein interconnection metal levels) and separated from a supporting substrate 100 by a buried oxide layer of SiO2 110. It has a front face F10 on the side of the encapsulation layer 140 and a rear face F20 on the side of the substrate 100. A mirror lens 160 is integrated at the level of the rear face F20. This lens 160 has the same characteristics as the lens 15 integrated at the level of the chip 1 according to the invention. The light guiding layer 120 comprises a waveguide 121' and a surface coupling array 122' which is configured to emit/receive light in the direction X, but in the direction of the chip face opposite the face whereon the array teeth are oriented (such an array may for example be designed in a silicon layer of thickness 160 nm wherein the array etching teeth are etched over a depth of 90 nm).

Without being exclusive in respect of this example of an embodiment, the chip according to the invention may have on the rear face F2 alignment patterns 17 with the other chip 3, and particular alignment patterns 17 intended to engage with complementary patterns 17' on the rear face of the other chip for example to ensure a mechanical alignment of the lenses 15 and 160 on the rear faces F2, F20 of the two chips 1, 3.

There is moreover represented in this FIG. 4, an electronic chip PE secured to the front face F10 of the photonic chip 3, for example by means of copper micropillars 20. The chip PE, intended to control or read active photonic components of the chip 3, is therefore connected, by means of the copper micropillars 20 and metal levels 124 traversing the layer 140, to these active photonic components (comprising for example a modulator 123) formed in the light guiding layer 120.

Figure 5A:
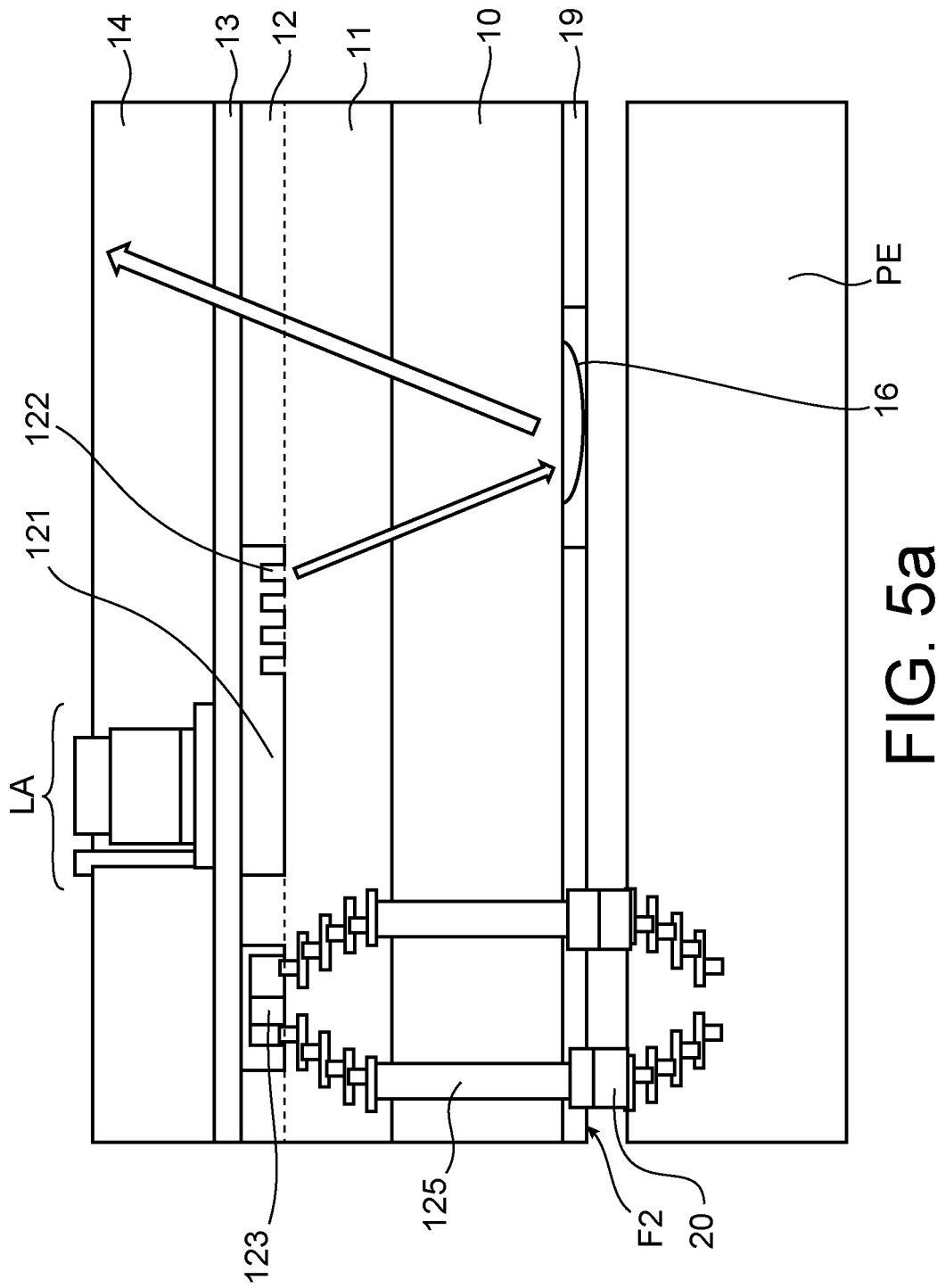
FIG. 5a and FIG. 5b illustrate two alternative embodiments of a photonic chip according to FIG. 3.
Figure 5B:
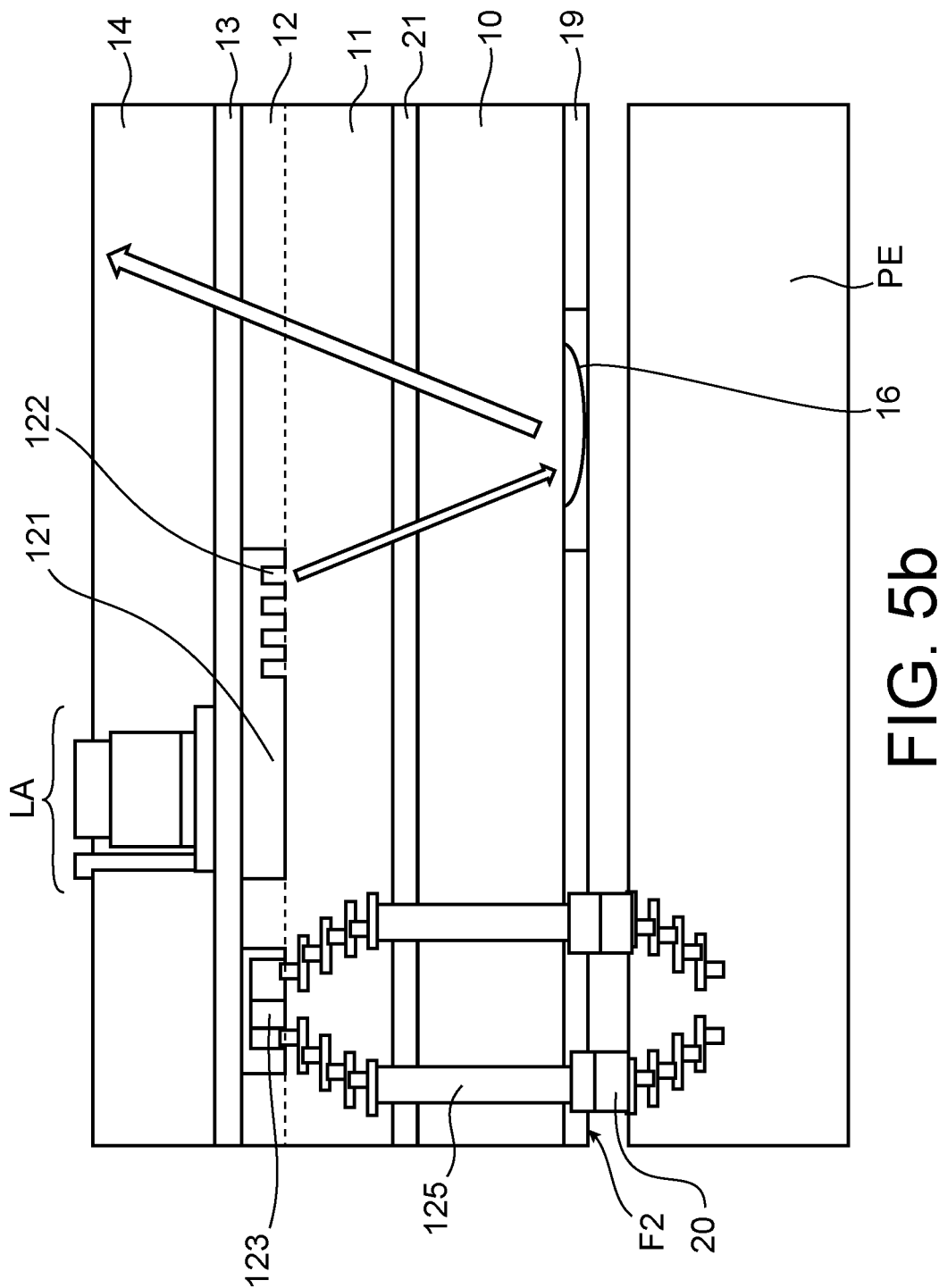

There is represented in FIGS. 5a and 5b two alternative embodiments of a photonic chip according to FIG. 3. These alternative embodiments differ in that in FIG. 5a, the substrate 10 is made of dielectric material, whereas in FIG. 5b, it is made of semiconductor material, typically silicon, and separated from the layer 11 by an anti-reflection layer 21. In these two figures, the substrate 10 is coated on the rear face side with a layer 19 of higher index than that of the substrate, for example a layer of silicon nitride.

In each of these two alternative embodiments, the surface coupling array 122 has etching teeth oriented, not towards the front face but, towards the rear face of the photonic chip. The optical coupling of the surface coupling array with the collimation structure on the rear face is thus more efficient. This superior coupling efficiency makes it possible not to have to arrange a mirror between the source coupling array and the front face.

There is moreover represented in these two FIGS. 5a and 5b, an electronic chip PE secured to the rear face F2 of the photonic chip, for example by means of copper micropillars 20. This chip PE, intended to control or read the active photonic components, is connected, particularly by means of electrical interconnection vias 125 traversing the substrate 10, to these active photonic components (comprising for example a modulator 123) formed in the light guiding layer 12.

There is represented in FIG. 6 an alternative embodiment of a photonic chip according to FIG. 2. As indicated above, there is chosen as a substrate 10 a silicon substrate, wherein is formed, on the light path between the surface coupling array 122 and the collimation structure (herein a lens 15), an air or oxide cavity 18. The lens 15 is then formed in a layer 19 covering the substrate 10 on the side opposite the front face F1.

In a preferential alternative embodiment of the invention, suitable for obtaining a photonic chip with inputs/outputs of light beams not only of expanded mode size but also having an expanded spectral band, the surface coupling array 122 is designed to be adapted to a reduced mode size (for example of 3 µm) with respect to that of a single-mode fibre (typically 9.2 µm). In this alternative embodiment, the surface coupling array is thus configured to receive/transfer light guided from/to the light guiding structure 121 and form/receive a light beam of mode size less than 6 µm towards/from the collimation structure.

It should be noted that such a design of the coupling array is not exclusive to the chip according to the invention with an integrated collimation structure on the rear face, but may be applied in any photonic chip where such an array receives/transfers light guided from/to a waveguide to form/receive a light beam of reduced mode size, particularly in a photonic chip with a collimation structure integrated or assembled on the front or rear face, and more particularly in a photonic chip integrating one or a plurality of hybrid silicon lasers or a chip carrying out wavelength multiplexing.

The following equation illustrates the dependency of the angle θ of light emission by a surface coupling array with the light wavelength $$\lambda: \frac{1}{\lambda}[-n_{11} \cdot \sin\theta + n_{\it eff}] = \frac{1}{\Lambda},$$

where $n_{11}$ is the index of the dielectric layer 11, $n_{\it eff}$ is the effective index of the light guiding layer 12 and $\Lambda$ is the array pitch. By deriving this equation with respect to λ, the following equation is obtained:

$$\frac{d\theta}{d\lambda} = \frac{1}{\Lambda}\frac{1}{n_{11}}.$$

By reducing the mode size Do=2*$w_o$ targeted for the beam at the input/output of the surface coupling array and towards/from the collimation structure, the numerical aperture NA is increased, and therefore the angle Φ of the light beam at the output of the network:

$$w_o = \lambda \cdot \frac{\pi}{NA} \text{ where } NA = n_{11} \cdot \sin\left(\frac{\Phi}{2}\right).$$

An expanded angle Φ will contain more wavelengths in the phase condition. By disposing a suitable lens facing this array, the spectral band of the "surfacing coupling array/lens" system is considerably expanded. Taking the example of an array with a reduce mode size at Do=3 µm, the spectral band is thus expanded to about 100 nm, where it is merely 32 nm for an array of standard mode size of 9.2 µm.

A surface coupling array of reduced mode size is differentiated physically from a standard array in that it is of lesser length (in the direction of light propagation), of lesser width (orthogonally to the light propagation direction), and in that the etching depth of the array lines is less substantial, as exemplified hereinafter from an approximate calculation.

| Mode size | Array length | Array width | Array etching: Non-etched Si/etched Si depth |
| --- | --- | --- | --- |
| Standard: 9.2 µm | ~30 µm | ~10 µm | 300 nm/150 nm |
| Reduced: 3 µm | ~10 µm | ~3 µm | 300 nm/50 nm |

Facing this array, the expanded spectral band light beam traversing a Silicon substrate 10 of 750 µm in thickness may be collimated and have a mode size of 120 µm (instead of 40 µm using a standard coupling array) by means of a lens 15, of aperture D=130 µm, of radius 540 µm and SAG=4 µm. The alignment tolerance of this lens with respect to this configuration of the surface coupling array is reduced, from +/−2 µm for a surface coupling array of standard mode size of 9.2 µm to +/−0.5 µm for a surface coupling array of mode size 3 µm. Such a reduced alignment tolerance remains however perfectly attainable since the alignment is carried out with lithography.

Two examples of a method for manufacturing of a photonic chip according to the invention and more particularly of a chip according to the second embodiment represented in FIG. 3 and of a chip according to the first embodiment represented in FIG. 6 are described hereinafter.

Within the scope of the first example illustrated by FIGS. 7a-7i, the method starts (FIG. 7a) with the supply of a SOI substrate having a buried oxide layer 13 inserted between a superficial silicon layer and a silicon substrate 30 and with the manufacture of photonic components (waveguide 121, surface coupling array 122, PN modulator 123, etc.) by partial or total localised etching of the superficial layer and, implantation in the case of the modulator. In this figure, light is propagated perpendicularly to the plane of the figure for the modulator, and in the plane of the figure for the waveguide and the surface coupling array.

There is subsequently undertaken (FIG. 7b) the formation of a BEOL encapsulation layer 11 made of dielectric materials, this layer comprising electrical interconnection metal levels 124 with the active photonic components (herein the modulator 123) of the light guiding layer 12.

There is mounted and subsequently bonded (FIG. 7c) a substrate 10 made of dielectric material, for example of $SiO_2$, on the encapsulation layer 11. This step does not require precise alignment during bonding (since the collimation structures have not yet been produced). Thinning of the substrate 10 may be carried out if required to attain a thickness typically between 50 μm and 750 μm. Alternatively, a substrate made of semiconductor material, for example of silicon, coated with anti-reflection layer, which is inserted after bonding between the substrate and the encapsulation layer 11, is used.

Figure 7A:
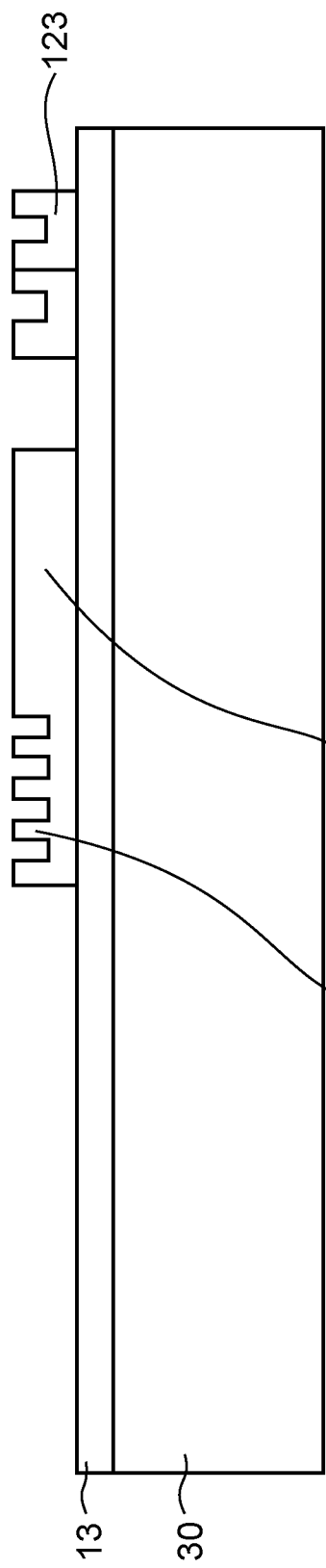
Figure 7B:
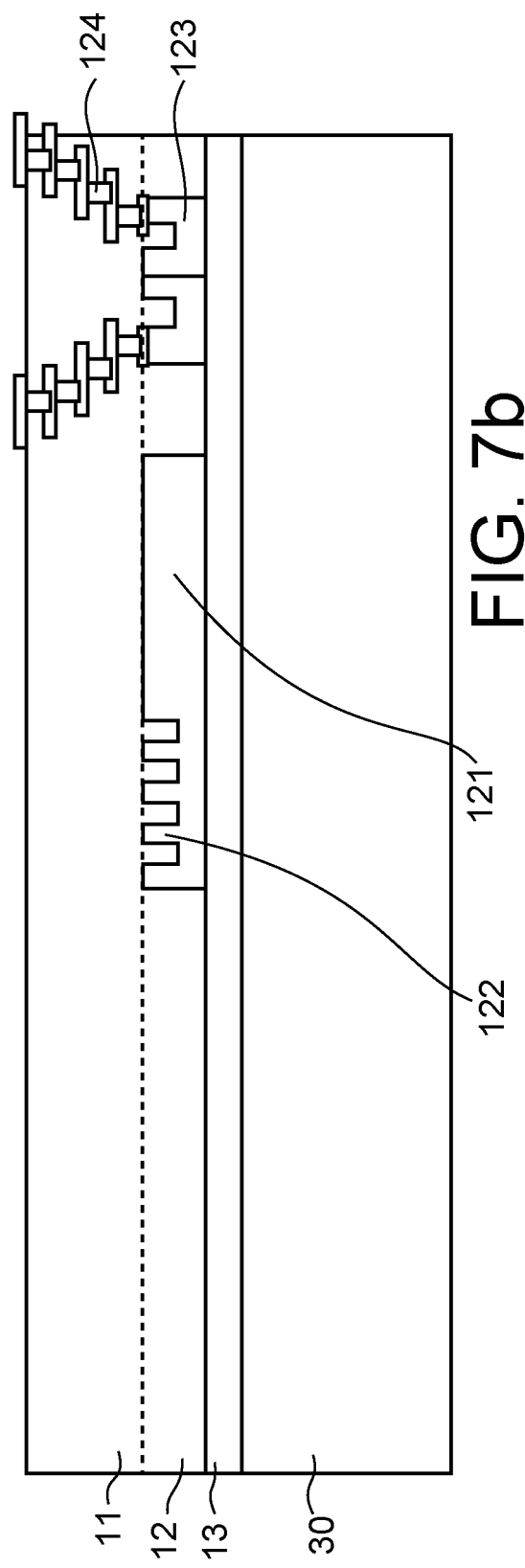
Figure 7C:
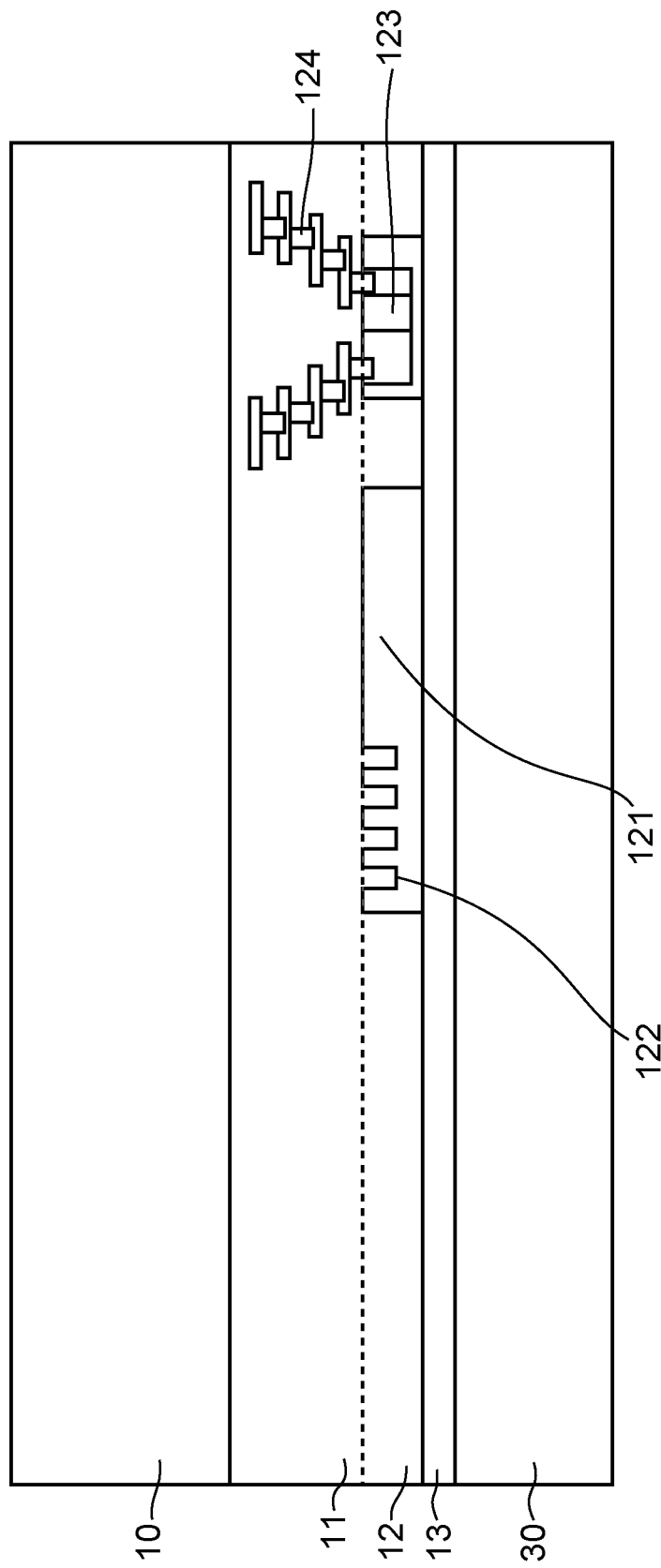
Figure 7D:
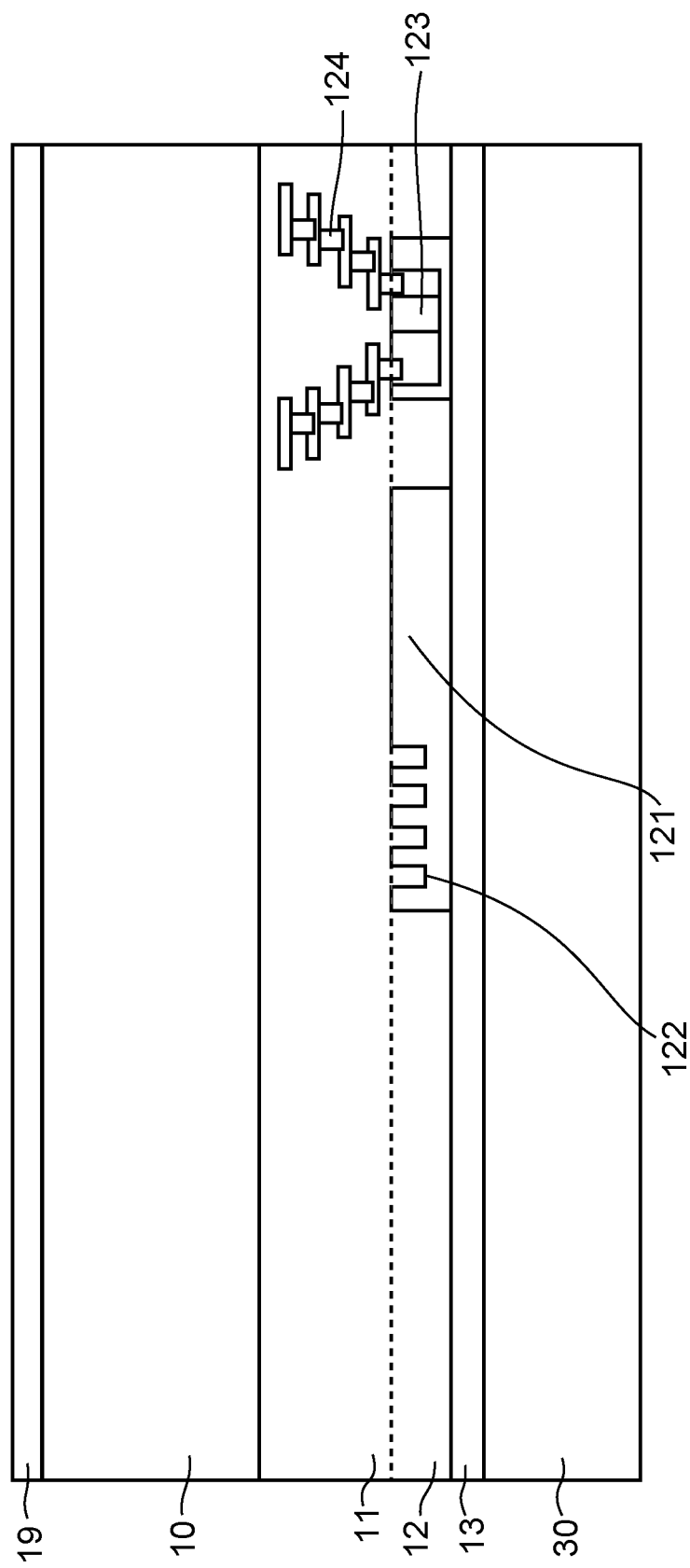
Figure 7E:
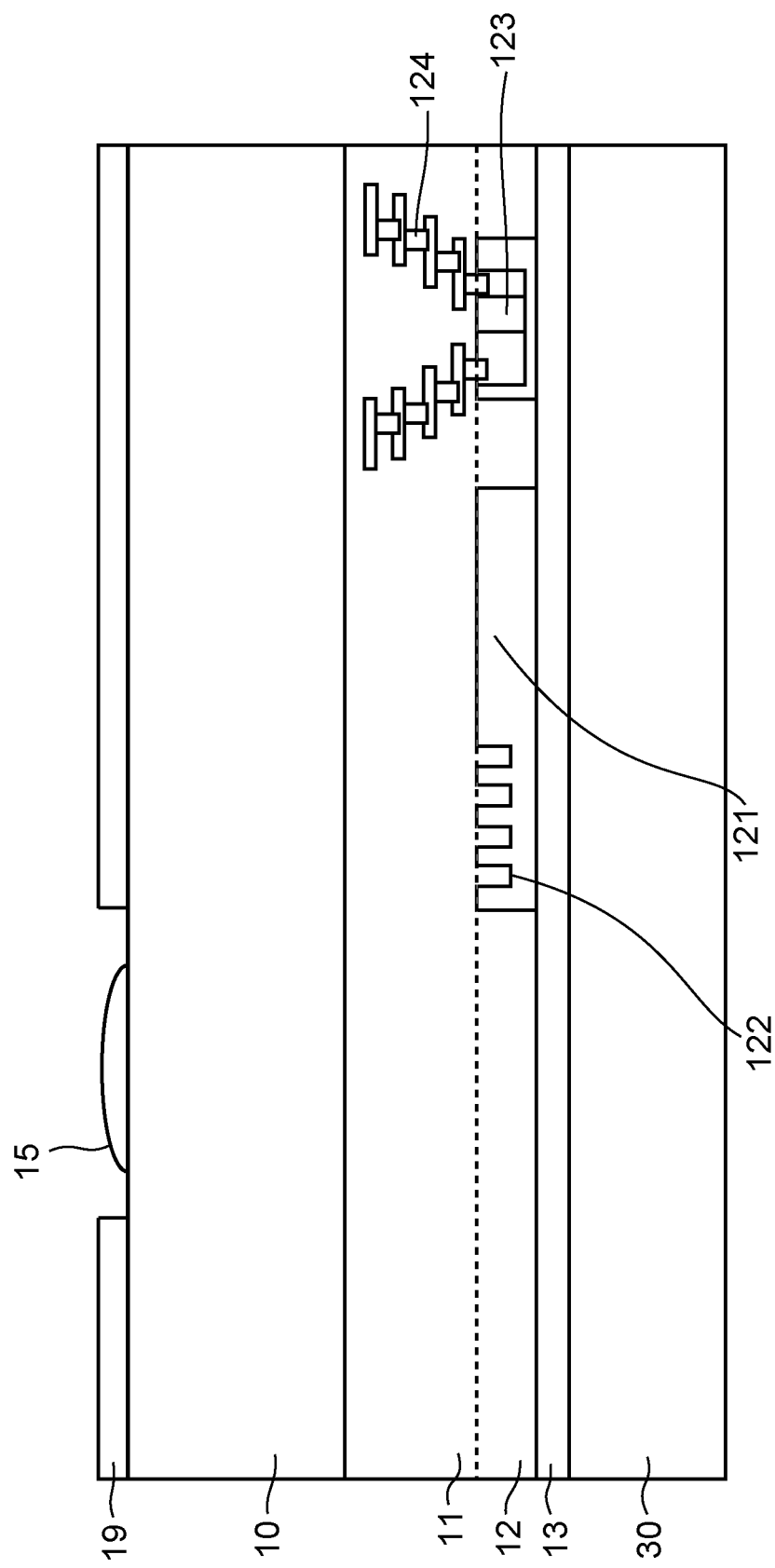
Figure 7F:
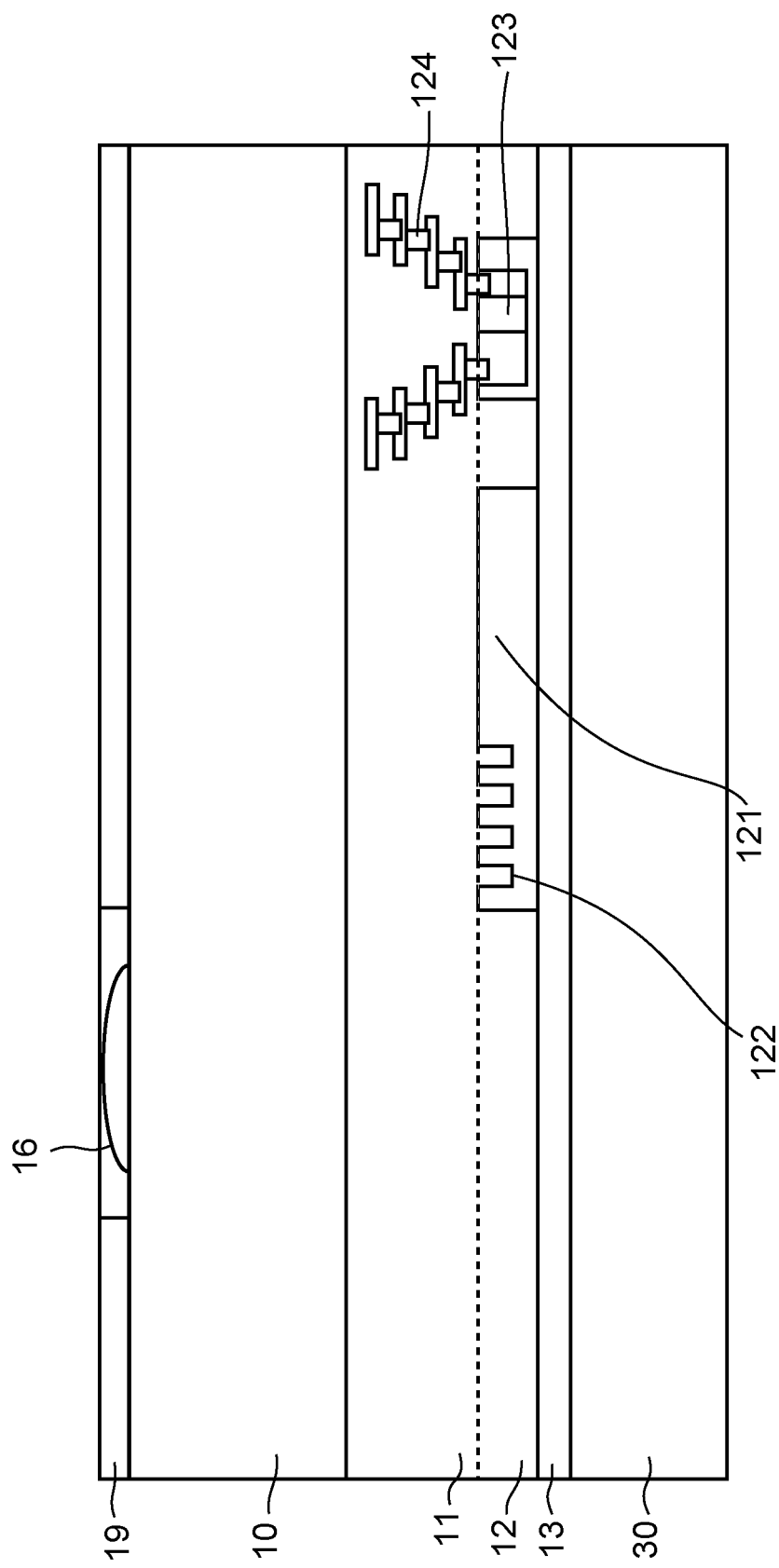
Figure 7G:
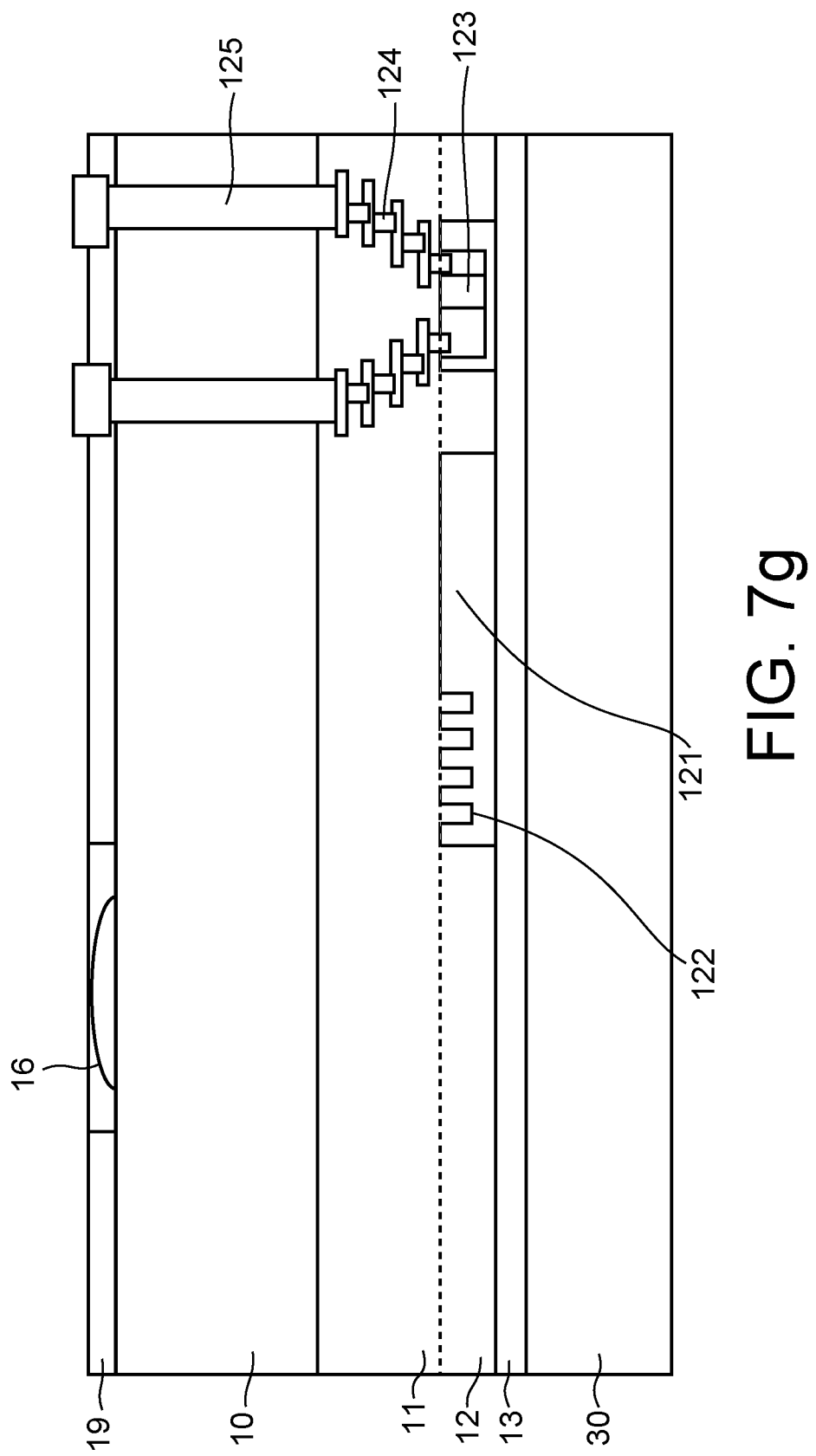

There is subsequently undertaken (FIG. 7d) the deposition of a layer of silicon nitride 19 onto the substrate 10, followed by the formation of a lens 15 in the layer of silicon nitride (FIG. 7e). The formation of the lens 15 may comprise mechanical etching, for example laser machining, or dry chemical etching (known as RIE for "Reactive Ion Etching") to form a spherical dioptre on the surface of the layer 19. The etching may be carried out after insolation of a photosensitive resin through a mask to form a boss of resin and creep of said bass. The lens 15 may also be manufactured by means of a so-called "Grey tone" lithography technique. The deposition of a metallic layer on the lens 15 is subsequently undertaken so as to form a concave spherical mirror 16 suitable for modifying the mode size of the light reflected thereon. The lens 15 may also be a Fresnel lens, particularly when the sagittal depth SAG is high, typically greater than several tens of μm.

Figure 7H:
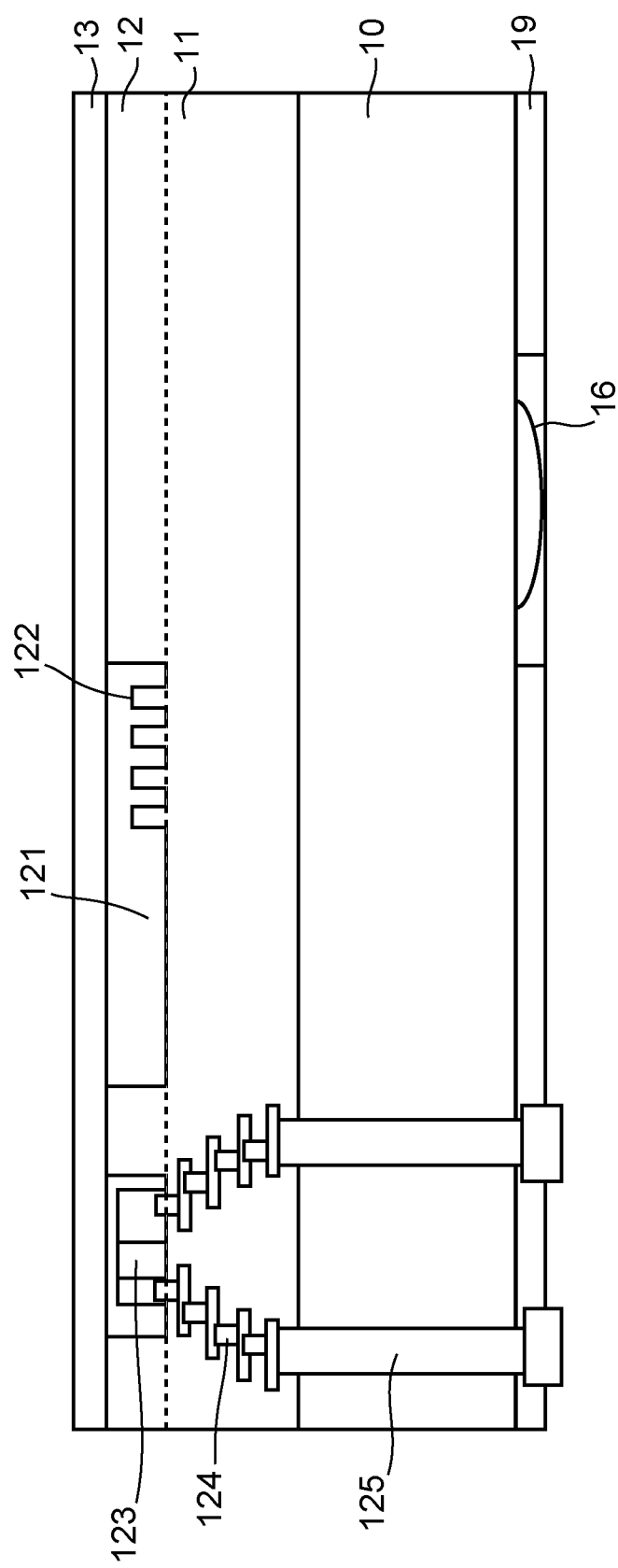

There is subsequently undertaken (FIG. 7g) the formation of vias through the substrate 10, for example by laser etching, and the filling of these vias with a metal to form the electrical interconnection vias 125 which, connected to those 124 present in the layer 11, make it possible to connect the active photonic components (such as a modulator 123) to an electronic chip. Turning of the wafer and removal of the silicon substrate 30 are subsequently undertaken (FIG. 7h). The etching teeth of the surface coupling array 122 are then oriented towards the rear face.

Figure 7I:
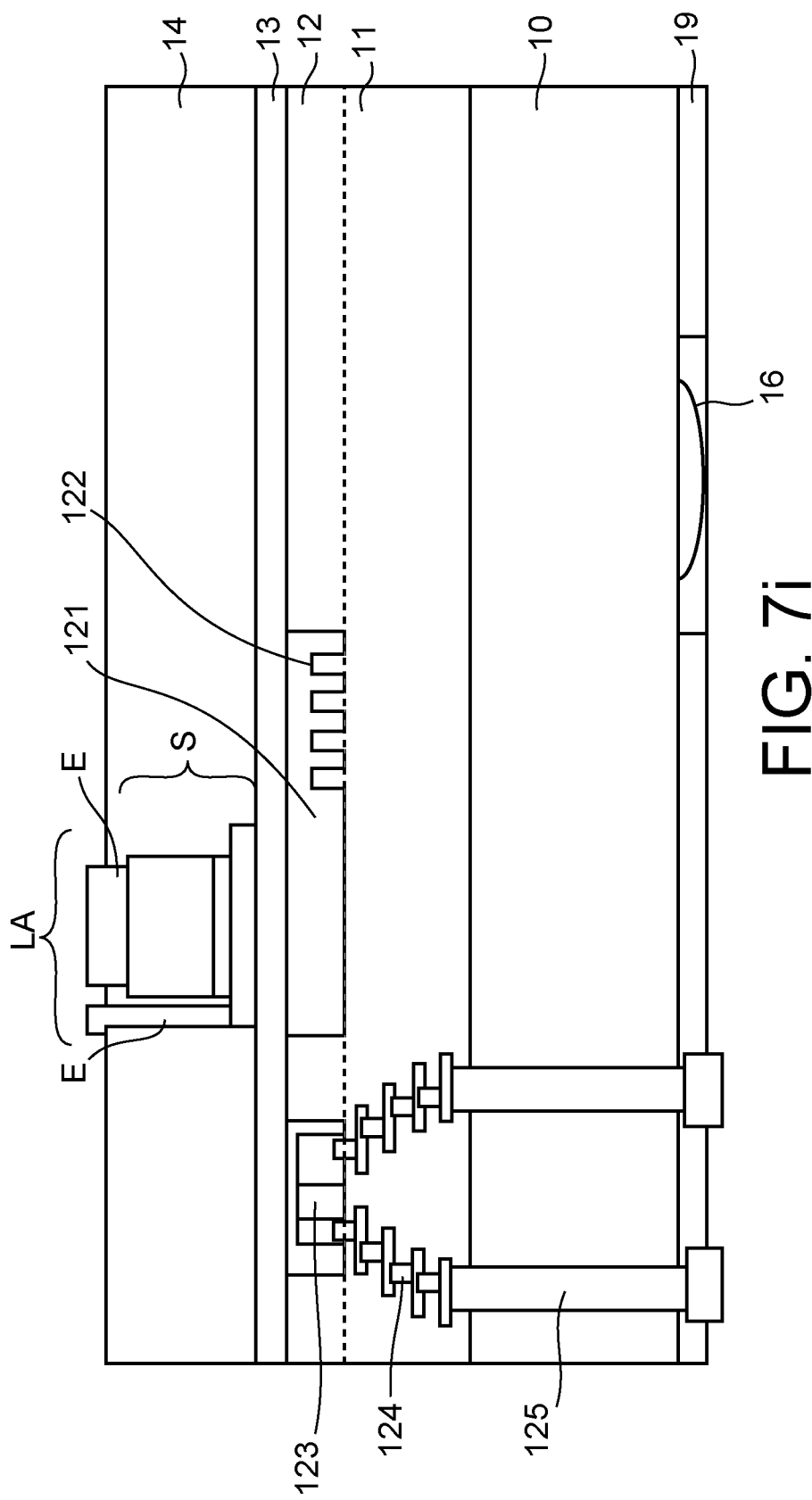

The laser LA is subsequently manufactured by producing a stack S of III-V layers on the layer 13, by structuring this alignment to form the gain medium of the laser, by manufacturing the electrodes E, and by forming the second encapsulation layer 14 (FIG. 7i).

The second example of a method for producing a photonic chip according to the invention is illustrated in FIGS. 8a-8f. This method starts (FIG. 8a) with the supply of an SOI substrate having a buried oxide layer 13 inserted between a superficial silicon layer and a silicon substrate 30 and with the manufacture of photonic components (waveguide, surface coupling array, PN modulator, etc.) by partial or total localised etching of the superficial layer and, implantation in the case of the modulator. The formation of a BEOL encapsulation layer 11 made of dielectric materials is subsequently undertaken. The method (FIG. 8b) uses a second substrate 10, for example made of silicon, wherein one or a plurality of air or oxide cavities 18 are formed. The substrate 10 is coated with a layer 19 of silicon oxide, silicon nitride or of a silicon oxide and silicon nitride mixture. A cavity 18 may be formed by TMAH chemical etching of silicon (highly selective etching of silicon with respect to the dielectric layer 19). This cavity has for example a size of 500 μm×500 μm. It has the aim of 1) increasing the focal length with respect to a silicon substrate, 2) facilitating the lithographic alignment of the lens (which is manufactured subsequently in the layer 19) with the surface coupling array. Indeed, the alignment between the lens and the surface coupling array is performed at a wavelength which is absorbed by silicon (but not by silicon nitride or silicon oxide). This alignment is then carried out using alignment patterns (not shown) which are produced in the light guiding layer 12 which includes the surface coupling array.

Figure 8E:
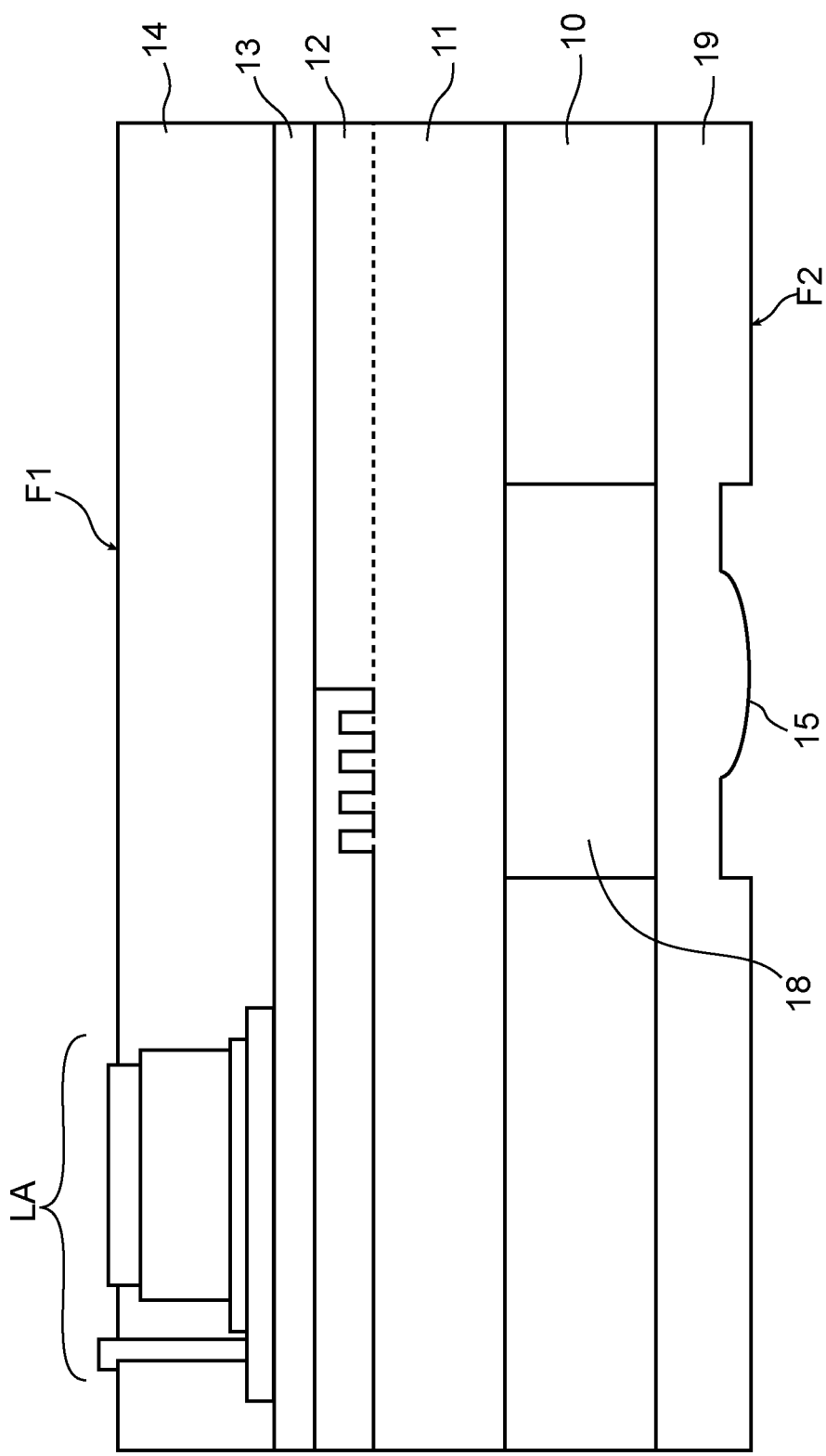

The two substrates are bonded (FIG. 8c). A lens is formed by dry etching of the layer 19 (FIG. 8d). Turning of the structure (the etching teeth of the surface coupling array 122 then found to be oriented towards the rear face), removal of the silicon substrate 30 and manufacture of the laser by producing a stack S of III-V layers on the layer 13, by structuring this alignment to form the gain medium of the laser, by manufacturing the electrodes E, and by forming the second encapsulation layer 14, are subsequently undertaken (FIG. 8e).

In the above description, the embodiment of the lens formed from the layer 19 and the substrate 10 after bonding the substrate 10 on the layer 11 is described. It is obviously possible to produce the lens in the stack formed from the layer 19 and the substrate 10 before bonding the substrate 10 on the layer 11. In such a scenario, the lens may be aligned with the surface coupling array with a superior precision to 1 μm.

The invention is not restricted to the photonic chip, but also extends to the manufacturing method thereof, and particularly to a method for manufacturing a plurality of chips collectively on the same wafer. This method comprises the formation of a collimation structure at the level of the rear face of the chip and of a surface coupling array configured to receive light from a light guiding structure and form a light beam directed towards the collimation structure.

The invention also extends to a system comprising the photonic chip according to the invention and the external device equipped with a collimation structure the mode size of which is adapted to that of the input/output light beam of the photonic chip and which is intended to reconverge the beam on a single-mode fibre for example.

The invention also relates to such a photonic chip suitable for integrating one or more hybrid lasers, such as lasers having a gain medium made of III-V semiconductor materials on a silicon substrate. This photonic chip is intended to supply a comb of wavelengths emitted by the plurality of lasers to another photonic chip not comprising lasers (see FIG. 4 for example), or indeed intended to emit a freely propagating light beam.

What is claimed is:

1. A photonic chip comprising a light guiding layer supported by a substrate, the light guiding layer including a light guiding structure optically coupled with a surface coupling array, the photonic chip having a front face on the side of the surface coupling array, a rear face on the side of the substrate and including a collimation structure integrated at the level of the rear face to increase a mode size of a light beam incident on said collimation structure from the surface coupling array, wherein the surface coupling array is configured to receive/transfer light from/to the light guiding structure and form/receive a light towards/from the collimation structure integrated at the level of the rear face, and wherein the collimation structure is a reflective structure capable of reflecting said light beam incident on said collimation structure from the surface coupling array at an angle away from the surface coupling array and towards the front face.

2. The photonic chip according to claim 1, wherein the substrate is made of a first dielectric material.

3. The photonic chip according to claim 2, wherein the rear face is coated with a layer of a second dielectric material having an effective index higher than an effective index of the first dielectric material, and wherein the collimation structure is formed in the layer of the second dielectric material.

4. The photonic chip according to claim 1, wherein the substrate is made of silicon.

5. The photonic chip according to claim 1, wherein the light guiding layer rests on a layer of dielectric material, and wherein an anti-reflection layer is inserted between the substrate and the layer of dielectric material.

6. The photonic chip according to claim 4, wherein the substrate comprises an air or oxide cavity formed on a light path between the surface coupling array and the collimation structure.

7. The photonic chip according to claim 1, wherein the surface coupling array has etching teeth oriented towards the rear face of the photonic chip.

8. The photonic chip according to claim 1, wherein the surface coupling array is configured to receive/transfer light from/to the light guiding structure and form/receive a light beam of mode size less than 6 μm towards/from the reflective collimation structure.

9. The photonic chip according to claim 1, wherein the rear face has alignment patterns with an external device.

10. The photonic chip according to claim 1, wherein the light guiding structure comprises an active photonic component and wherein electrical interconnections connected to the active photonic component are formed in the substrate and open onto the rear face.

11. An electro-optical device, comprising a photonic chip according to claim 10 and an electronic chip mounted on the rear face of the photonic chip and connected to the electrical interconnections.

12. The photonic chip according to claim 1, further comprising a hybrid silicon integrated laser comprising a gain structure on top of the light guiding layer and optically coupled with the light guiding structure.

13. An electro-optical device, comprising a photonic chip according to claim 12 optically coupled with a photonic chip photonic chip comprising a light guiding layer supported by a substrate, the light guiding layer including a light guiding structure optically coupled with a surface coupling array, the photonic chip having a front face on the side of the surface coupling array, a rear face on the side of the substrate and including a collimation structure integrated at the level of the rear face to increase a mode size of a light beam incident on said collimation structure from the surface coupling array, wherein the surface coupling array is configured to receive/transfer light from/to the light guiding structure and form/receive a light towards/from the collimation structure integrated at the level of the rear face, and wherein the collimation structure is a reflective structure capable of reflecting said light beam incident on said collimation structure from the surface coupling array towards the front face.

* * * * *